United States Patent [19]

Minagawa et al.

[11] 4,110,155

[45] Aug. 29, 1978

[54] METHOD OF MANUFACTURING SYNTHETIC RESIN COATED PAPERS

[75] Inventors: Nobuhiko Minagawa; Tomoaki Ozaki, both of Fujimiya, Japan

[73] Assignee: Fuji Photo Film Co., Ltd., Minami Ashigara, Japan

[21] Appl. No.: 533,360

[22] Filed: Dec. 16, 1974

Related U.S. Application Data

[63] Continuation of Ser. No. 272,509, Jul. 17, 1972, abandoned.

[30] Foreign Application Priority Data

Jul. 17, 1971 [JP] Japan .................................. 46-53317

[51] Int. Cl.$^2$ .............................................. D21H 1/10
[52] U.S. Cl. ............................... 162/135; 162/181 A; 428/511
[58] Field of Search .................... 162/181 A, 135, 138; 427/209, 326, 411; 428/513, 511

[56] References Cited

U.S. PATENT DOCUMENTS

| | | | |
|---|---|---|---|
| 3,075,859 | 1/1963 | Pelph et al. | 117/155 R |
| 3,118,789 | 1/1964 | Wiswell et al. | 117/68 |
| 3,348,970 | 10/1967 | Gess | 117/68 |
| 3,385,730 | 5/1968 | Pelph | 162/181 A |
| 3,459,593 | 8/1969 | Cole | 117/201 |
| 3,493,427 | 2/1970 | Takagi et al. | 117/155 UA |
| 3,615,403 | 10/1971 | Cheng | 162/138 |
| 3,873,354 | 3/1975 | Walters | 162/138 |

OTHER PUBLICATIONS

Calkin; J.B., "Modern Pulp and Papermaking", Reinhold Publishing Co., N.Y., N.Y., 1957, p. 476.
Casey; J. P., "Pulp and Paper", Sec. Ed., vol. III, Interscience Pub., N.Y., N.Y., 1960, pp. 1360–1361.

*Primary Examiner*—S. Leon Bashore
*Assistant Examiner*—William F. Smith
*Attorney, Agent, or Firm*—Sughrue, Rothwell, Mion, Zinn and Macpeak

[57] ABSTRACT

In manufacturing a laminate of a paper substrate having synthetic resin films coated on the both surfaces, the formation of wavy deformations at the edges of the laminate is prevented by incorporating in the base paper sheet a deliquescent salt in an amount of from about 0.5 to 5% by weight based on the weight of the paper substrate.

8 Claims, 2 Drawing Figures

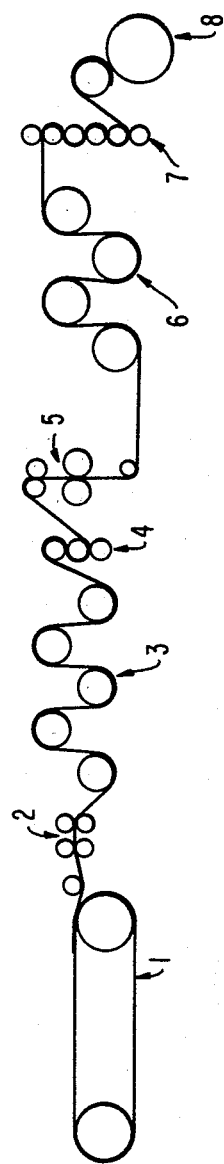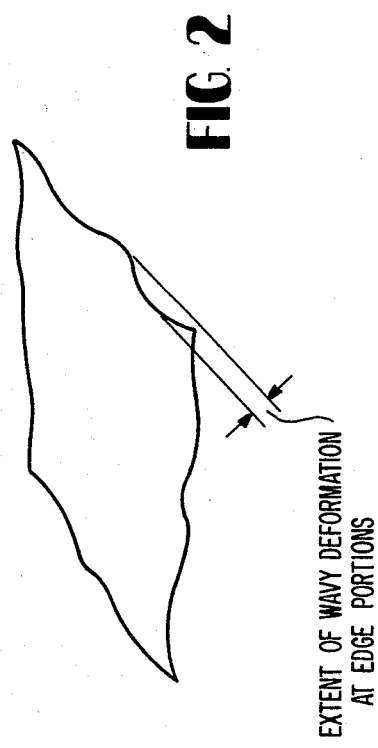

METHOD OF MANUFACTURING SYNTHETIC RESIN COATED PAPERS

This is a continuation of application Ser. No. 272,509 filed July 17, 1972 now abandoned.

BACKGROUND OF THE INVENTION

1. Field of the Invention

This invention is directed to a method of manufacturing a paper substrate used as a base material for a resin-coated laminate. More specifically, the invention is directed to a method of preventing the formation of wavy deformations at the edges of a laminate of a paper sheet having synthetic resin films coated on the both surfaces.

2. Description of the Prior Art

To improve the strength of papers, to render papers waterproof, and to improve the rigidity of synthetic resin films, a so-called laminate paper having the piled structure of a paper sheet and a synthetic resin film has been provided. In particular, to improve the water proof characteristics of papers, a laminate paper having synthetic resin films coated on the both surfaces of a paper has been used.

As the synthetic resins used for the purpose, polyolefins, polyesters, polyamides, cellulose esters, and the like are known. In applying polyolefins to the surface of a paper sheet or web, the molten polyolefin is cast on a travelling paper sheet to provide a coated layer thereon. This method is generally called an extrusion coating method. In the case of coating a polyester or a cellulose ester, a so-called lamination method is usually employed in which the resin films are applied to the both sides of the paper sheet using an adhesive.

In either the laminate product or the unfinished product during the conversion thereof, both sides of the coated laminate sheet tends to be accompanied by the formation of wavy deformations at or near the edge portions thereof. That is to say, when a web of a laminate papers coated on both sides is allowed to stand in a rolled condition, wavy deformations occur at or near both edge portions of the rolled laminate paper and also when a number of squares of a laminate paper coated on both sides is allowed to stand in a piled state, a wavy deformation also occurs at or near the four edge portions of the piled laminates.

If such a wavy deformation occurs in laminate papers, the appearance of the product decreases, which reduces the commercial value of the product, and further the deformation makes it quite difficult to apply a secondary working such as a printing and a coating. Accordingly, the formation of the wavy deformations is one of the most undesirable disadvantages in laminate papers coated on both sides.

The inventors, as the result of much research for preventing the formation of the wavy deformation in laminate papers coated on both sides, have succeeded in obtaining the process of the present invention. The inventors have discovered that the occurrence of the wavy deformations at the edge portions of laminated papers is influenced largely by the water content of the paper substrate at the time of the coating of the synthetic resin, i.e., the weight of water or moisture contained in a unit weight of the paper substrate and further when the water content is greater than about 6% by weight, a laminate paper prepared from the paper substrate and coated on both sides has less or no formation of the wavy deformations at the edge portions. In this case, however, it has also been found that the water content of the paper substrate has an upper limit, that is to say, if the water content is over about 10% by weight, the rigidity of a laminate paper coated on both sides is reduced or the adhesive properties between the resin coatings and the substrate paper decreases. Thus, it has been discovered that in order to effectively prevent the formation of the wavy deformations at the edge portions of a laminate paper coated on both sides without degrading the other properties, the water content of the paper substrate should be from about 6% by weight to about 10% by weight. In other words, when a paper having a water content of from about 6 to about 10% by weight is produced when the paper is manufactured and a laminate paper coated on both sides is prepared using such a paper as the substrate, an improved laminate product unaccompanied by the occurrence of wavy deformations at the edge portions thereof as well as other difficulties in regard to the properties as described above is obtained.

However, the final water content of the papers produced in the conventional paper manufacturing process generally is lower than about 6% by weight or ranges from about 3 to 6% by weight. Incidentally, it sometimes happens that the water content of papers ranges from about 6 to 10% by weight in the transition stage immediately after the start of the manufacturing of the papers but it is quite difficult to produce papers smoothly for a long period of time while maintaining constantly such a high water content in the papers.

As a method of adjusting the water content of papers, in particular, increasing the water content of papers, a method of humidifying the papers by controlling the extent of drying in a dryer or by passing the papers through a wetting zone after drying is known. However, in controlling the extent of drying in the dryer, it is necessary to increase excessively the water content of the papers as a matter of course in the first half of the paper manufacturing process to increase the water content of the final paper product and consequently the papers tend to be cut and further localized undried portions form when the papers are subjected to a smoothing calender or a machine calender. Also, in passing the papers through a wetting zone, large humidifying equipment is required and the cost increases. Thus, these known methods are undesirable commercially.

The process of this invention has been attained as the result of the inventors' research on increasing the water content of the final paper products yet unaccompanied by the aforedescribed difficulties.

SUMMARY OF THE INVENTION

That is to say, according to the process of this invention, a deliquescent salt at a level of from about 0.5 to 5% by weight is incorporated in the papers used as the paper substrates for laminate papers. Thus, by incorporating a suitable amount of the above-described salt in the paper substrate, the drying of the paper in the latter half of the paper manufacturing process is controlled and the water content of the final paper product can be readily adjusted to from about 6 to 10% by weight.

BRIEF DESCRIPTION OF THE ACCOMPANYING DRAWINGS

FIG. 1 is a schematic view showing a paper manufacturing system employed in the experiments of this invention for producing a paper substrate containing the salt described above.

FIG. 2 is a perspective view showing wavy deformations formed at the edge portions a laminate paper prepared in a conventional manner.

DESCRIPTION OF THE INVENTION

Suitable deliquescent salt which can be used are lithium chloride, calcium chloride, magnesium chloride, aluminum chloride, zinc choride, ferrous chloride, lithium bromide, sodium nitrite, sodium nitrate, and aluminum nitrate.

The amount of the salt incorporated depends on the type of paper manufacturing machine and the operating conditions of the paper manufacturing machine such as the concentration of salt present in a sizing solution, the temperature of the sizing solution and the density of the paper produced, but according to the inventors' investigations, the amount of the salt ranges from 0.5 to 5, preferably from about 0.5 to 3%, by weight based on the weight of the paper. Also, from the view point of the efficiency of the salt incorporated in the paper, it is desirable to incorporate the salt in the paper by sizing the salt into the surfaces of the paper using a size bath or size press but the salt can be incorporated when the raw materials for the paper are prepared.

Now referring in greater detail to the accompanying drawings, in FIG. 1, a raw paper formed using a wire part 1 is passed through a wet press 2 and dried using a series of dryers 3. The dried paper is, then, passed through a smoothing calender 4 and sent to a size press 5, wherein a sizing is applied to the surface of the paper. The paper thus sized is passed through a second series of dryers 6 and a machine calender 7 and rolled up on a reel 8. The deliquescent salt can be incorporated in the paper in the sizing zone 5.

Any type of paper substrate for example, in a thickness ranging from about 30 to 400g/m², preferably from about 50 to 300 g/m², can be used in this invention. Any of the conventionally used synthetic resins, for example, in a thickness ranging from about 5 to 100μ preferably about 5 to 60μ, for preparing laminated papers can be employed in the invention. Suitable such synthetic resins are polyolefins, polyesters, polyamides, cellulose esters, polyvinyl chloride and the like.

Now, the invention will further be described in greater detail by reference to the following examples although the invention is not to be interpreted as limited to them only.

In the examples the water content of the paper was measured using the method of JIS (Japanese Industrial Standard) 0-8127 (1958). Also, the evaluation of the wavy deformation was made in the follow way: a laminate paper coated on both sides was cut into a 30 cm × 30 cm sheet in a chamber maintained at a constant temperature of 20° C ± 1° C. and a constant relative humidity of 65 ± 5% RH and, after allowing the sheet to stand for 24 hours, the maximum amplitude (distance) of the wavy deformation formed at the edge of the sheet as shown in FIG. 2 was taken as extent of the wavy deformation. Thus, the smaller the value of the amplitude is the less the extent of the wavy deformation.

EXAMPLE 1

A slurry of a 1 : 1 by weight mixture of a kraft pulp of a broad-leaved tree and a kraft pulp of a needle leaf tree was beaten in a beater to 40° SR (Schopper Liegers Degree) and using the paper manufacturing machine as shown schematically in FIG. 1 of the accompanying drawings, a 120 g/m² weight paper was manufactured at a speed of 100 meters/mir. In the paper manufacturing system employed in the example, the temperatures of the dryers were 110° C in the first series of dryers 3 and 70° C. in the second series of dryers 6. In the size press zone 5, a sizing solution I, II, III, IV, or V having the composition shown in Table 1 below was applied to the surfaces of the paper and the paper thus sized was designated paper A, B, C, D, or E respectively.

Table 1

| | | Sizing Composition: | | |
|---|---|---|---|---|
| | | Gelatin | Calcium Chloride (kg) | Water (liters) |
| Solution | I | 4 kg | None | 100 |
| " | II | 4 kg | 0.07 | 100 |
| " | III | 4 kg | 0.12 | 100 |
| " | IV | 4 kg | 0.30 | 100 |
| " | V | 4 kg | 0.80 | 100 |

The water content and the calcium chloride content of each of the papers A,B,C,D, and E on the reel 8 are shown in Table 2.

Table 2

| | Water Content and CaCl₂ Content: | | |
|---|---|---|---|
| | Sizing Solution | Water Content | CaCl₂ Content (g/100 g.paper) |
| Paper A | I | 5.5% | None |
| Paper B | II | 7.0% | 0.5 |
| Paper C | III | 7.6% | 0.9 |
| Paper D | IV | 8.1% | 2.0 |
| Paper E | V | 10.5% | 5.2 |

Thereafter, polyethylene (SG: 0.926; MI;2) was applied to both surfaces or sides of each of the papers A, B, C, D, and E thus manufactured using an extrusion coating method at a thickness of 30 microns for each of the polyethylene layers.

The wavy deformation at the edge portions of the both side coated laminate sheet obtained using the above procedures were evaluated in the manner as described above and the results obtained are shown in the following table.

Table 3

| | Wavy Deformation of the Both Side Coated Laminate Sheet: |
|---|---|
| | Wavy Deformation (mm) |
| Paper A | 18 |
| Paper B | 4 |
| Paper C | 0 |
| Paper D | 0 |
| Paper E | 0 |

From the above results it can be seen that by incorporation of an appropriate amount of calcium chloride in the substrate paper of the both side coated laminate sheet, the formation of the wavy deformation at the edge portions of the sheet could be prevented. In the above experiment, however, Paper E showed poor adhesive properties between the paper substrate and the polyethylene layers.

EXAMPLE 2

Using an aqueous slurry containing a bleached sulfide pulp of a needle-leaf tree, aluminum sulfate (about 0.2 to 2% by weight), and rosin, (about 0.2 to 2% by weight) a 180 g/m² weight paper was manufactured at a speed of 20 meters/min. using the paper manufacturing machine shown schematically in FIG. 1. The surface temperatures of the dryers in the system were 110° C in the first series of dryers and 70° C in the second series of dryers.

In the size press zone 5, each of the sizing solutions VI, VII, and VIII have the composition shown in Table 4 below was applied to the paper and the papers thus sized were designated papers F, G, and H respectively.

Table 4:

|  |  | Size Composition: | | | |
|---|---|---|---|---|---|
|  |  | Gelatin (kg) | $MgCl_2$ (kg) | LiCl (kg) | Water (liters) |
| Solution | VI | 6 | 0 | 0 | 100 |
| " | VII | 6 | 0.30 | 0 | 100 |
| " | VIII | 6 | 0 | 0.30 | 100 |

The water content and the salt content of each of the papers F, G, an H are shown in the following table.

Table 5

|  | Water Content and Salt Content: | | |
|---|---|---|---|
|  | Sizing Solution | Water Content (%) | Salt Content* (g/100 g-paper) |
| Paper F | VI | 4.5 | 0 |
| Paper G | VII | 7.5 | 2.3/100 |
| Paper H | VIII | 7.5 | 2.4 |

*magnesium chloride or lithium chloride.

Polyester films each having a thickness of 25 microns were applied to both surfaces of each of the papers F, G, and H using Movinyl 761H (an aqueous emulsion of an acrylate resin, a trade name, produced by Hoechst Gosei K. K.) as an adhesive and the extent of the wavy deformation of each of the both side coated laminate sheet thus prepared was evaluated using the method described above. The results obtained are shown in the following table.

Table 6

| Wavy Deformation of Laminate: | |
|---|---|
|  | Wavy Deformation (mm) |
| Paper F | 10 |
| Paper G | 0 |
| Paper H | 0 |

As is clear from the above results, the formation of the wavy deformation at the edge portions of the both side coated laminate sheet was prevented completely by the incorporation of magnesium chloride or lithium chloride according to the present invention.

EXAMPLE 3

A 5% slurry of a kraft pulp of a broad-leaved tree was beaten in a Hallander beater to 40° SR and then the slurry thus beaten was mixed with 2% by weight (dry weight percent per unit weight of dry pulp) of a fatty acid soap(sodium stearate), 0.5% by weight of a melamine-formaldehyde resin, 2% by weight of aluminum sulfate, and 5% by weight of calcium chloride.

The mixture was diluted with water until the concentration of the pulp was 0.8% and from the aqueous mixture prepared, a 120 g/m² weight paper was manufactured using a conventional cylinder paper machine. The calcium chloride content and the water content of the paper thus manufactured were 1.4% by weight and 6.5% by weight, respectively. For comparison, a paper containing no calcium chloride was manufactured under the same conditions as above and the water content of the comparison paper was confirmed to be 4.8% by weight.

Films of a low density polyethylene (SG: 0.916; MI:7) were applied to both surfaces of each of the paper of this invention and the comparison paper using an extrusion coating method at a thickness of 30 microns each to provide both side coated laminate sheets I and J, respectively. The extent of the wavy deformation of the both side coated laminate sheets thus prepared was evaluated. The results obtained are shown in the following table.

Table 7

|  | Water Content and $CaCl_2$ Content; and Wavy Deformation of Laminate Sheet: | | |
|---|---|---|---|
|  | $CaCl_2$ Content (g/m²) | Water Content (%) | Wavy Deformation (mm) |
| Paper I | 1.4 | 6.5 | 2 |
| Paper II | 0 | 4.8 | 15 |

As is clear from the results shown above, the formation of the wavy deformation of the polyethylene coated laminate sheet could be markedly reduced by incorporating calcium chloride in the pulp slurry for manufacturing the paper used as the substrate of the both side coated laminate sheet.

Comparison Example

When producing paper F using the same procedures as used in Example 2, the surface temperatures of the dryers were reduced to 90° C in the first series of dryers and 65° C in the second series of dryers to increase the water content of the paper on the reel. The water content of the paper on the reel varied from 6.2% to 7.6% by weight and further localized undried spots were observed on the paper coming from the smoothing calender. Thus, this confirmed that it is difficult to increase stably the water content of the paper on the reel and not have it accompanied with the aforesaid difficulties.

While the invention has been described in detail and with reference to specific embodiments thereof, it will be apparent that various changes and modifications can be made therein without departing from the spirit and scope thereof.

What is claimed is:

1. In a method of manufacturing a laminate paper having a synthetic resin film coated on both surfaces of the paper substrate which comprises manufacturing a paper substrate and applying said resin film to both surfaces of said substrate, the same synthetic resin being applied to each surface, the improvement comprising preventing the occurrence of wavy deformations at or near the edge portions of the laminate paper by incorporating during manufacturing of said paper substrate a deliquescent salt in an amount of from about 0.5 to 5% by weight based on the weight of said paper substrate, and adjusting the water content of said paper substrate to 6 to 10% by weight during said manufacturing and applying said resin film while said substrate has said water content.

2. The method of claim 1, wherein said deliquescent salt is calcium chloride, magnesium chloride or lithium chloride.

3. The method of claim 1, wherein said manufacturing includes a sizing step and wherein said deliquescent salt is incorporated in said paper substrate during the sizing step of manufacturing the paper.

4. The method of claim 3, wherein said deliquescent salt is incorporated using an aqueous solution of said salt.

5. The method of claim 1, wherein said deliquescent salt is incorporated in said paper substrate in the preparing of an aqueous paper pulp composition for manufacturing the paper.

6. The method of claim 1, wherein said deliquescent salt is incorporated in an amount of from 0.5 to 3% by weight.

7. A laminate paper having synthetic resin films coated on both surfaces of a paper substrate, the same synthetic resin being applied to each surface, said paper substrate containing a deliquescent salt at a level sufficient to adjust the water content of said paper substrate from about 6 to 10% by weight, said level being 0.5 to 5% by weight based on the weight of said paper substrate.

8. The laminate paper having synthetic resin films coated on both surfaces of said paper substrate of claim 7, wherein said deliquescent salt is calcium chloride, magnesium chloride, or lithium chloride.

* * * * *